United States Patent [19]

Wagner

[11] 4,055,872
[45] Nov. 1, 1977

[54] APPARATUS FOR TENDERIZING MEAT

[75] Inventor: Richard C. Wagner, Frankfort, Ill.

[73] Assignee: Hollymatic Corporation, Park Forest, Ill.

[21] Appl. No.: 702,932

[22] Filed: July 6, 1976

[51] Int. Cl.$^2$ .............................................. A22C 9/00
[52] U.S. Cl. ....................................................... 17/25
[58] Field of Search ................... 17/25, 28; 83/620, 6, 83/1

[56] References Cited

U.S. PATENT DOCUMENTS

| | | | |
|---|---|---|---|
| 2,841,818 | 7/1958 | Griffith | 17/25 |
| 3,256,801 | 6/1966 | Greenspan | 17/25 X |
| 3,263,539 | 8/1966 | Daniel et al. | 83/620 X |
| 3,535,734 | 10/1970 | Ross | 17/25 |
| 3,727,267 | 4/1973 | Clark | 17/25 |
| 3,736,583 | 5/1973 | Smith | 17/25 X |
| 3,842,464 | 10/1974 | McCord | 17/25 |
| 3,991,439 | 11/1976 | Wagner | 17/25 |

Primary Examiner—David H. Brown
Attorney, Agent, or Firm—Wegner, Stellman, McCord, Wiles & Wood

[57] ABSTRACT

Apparatus for tenderizing meat that contains fibers, tissues and similar toughening elements and including reciprocable spaced long slender knives with sharp meat penetrating and severing blade ends with means for reciprocating the knives into and from meat penetration. The apparatus particularly includes means for mounting these blades at an angle other than 0° to the direction of movement of a meat conveyor and staggering the blades so that the assembly of blades spans substantially the entire meat carrying portion of the conveyor so that as the blades are reciprocated into and from meat penetration as the conveyor moves the meat in increments all of the toughening elements are severed.

19 Claims, 11 Drawing Figures

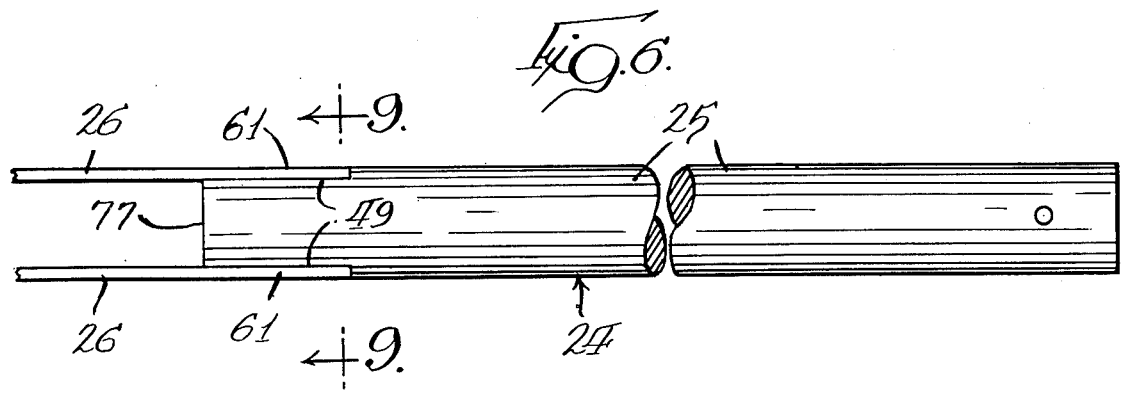
Fig. 6.
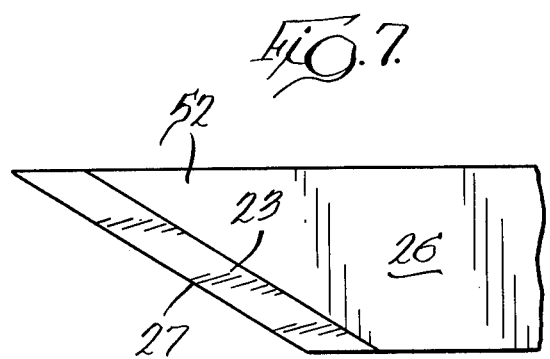
Fig. 7.
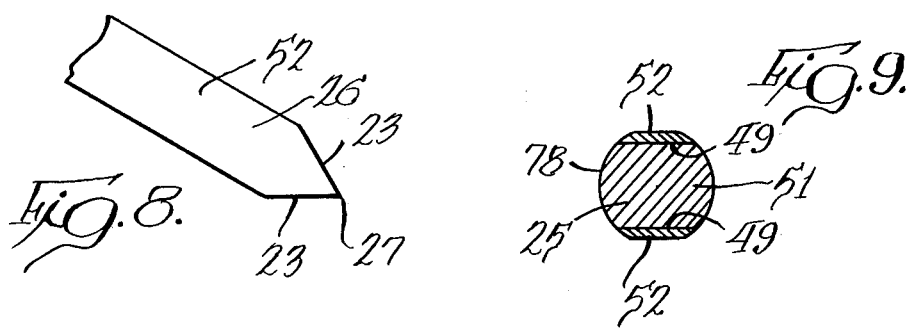
Fig. 8.
Fig. 9.

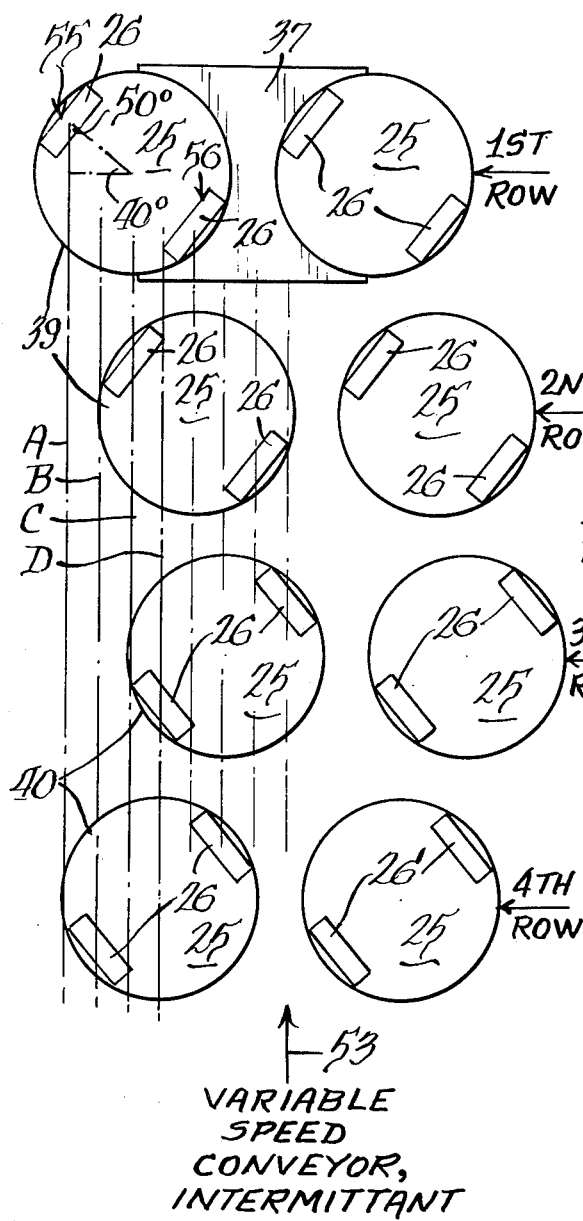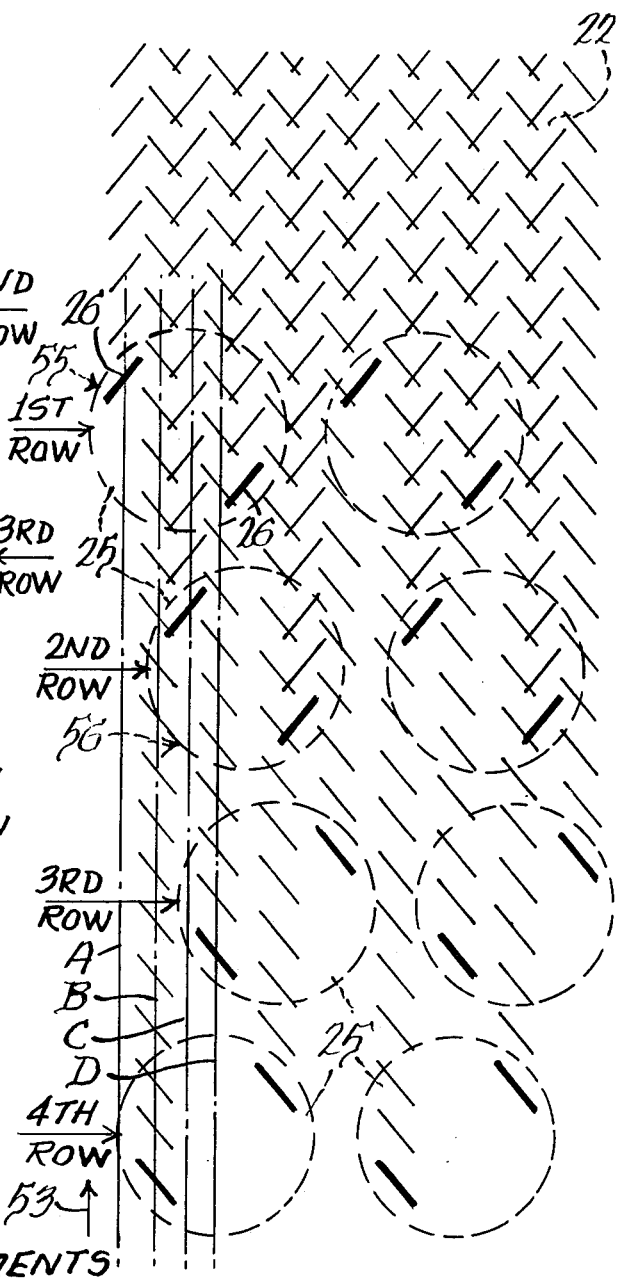

APPARATUS FOR TENDERIZING MEAT

CROSS REFERENCE TO RELATED PATENTS & APPLICATION

U.S. Pat. No. 3,736,623 discloses and claims a sloped arrangement of long slender meat penetrating knives that aids in cutting every fiber regardless of how the fibers are arranged relative to the knives.

U.S. Pat. No. 3,842,464 discloses and claims an improved yieldable knive tenderizer so that the knives will yield when striking a bone, thereby preventing damage to the blades of the knives.

U.S. Pat. No. 3,991,439 discloses and claims one type of yieldable means for a yieldable knife tenderizer.

The above patents are assigned to the assignee hereof.

BACKGROUND OF THE INVENTION

This invention relates to a meat tenderizing apparatus in which long slender knives are reciprocated into and out of meat that is transported in intermittent movement through the apparatus and with the blades of the knives being arranged in a particular relationship to each other so as to sever into relatively short lengths all of the meat toughening elements including fibers, gristle and the like.

In addition to U.S. Pat. No. 3,736,623 which covers apparatus for tenderizing both boneless and bone-in meat in which the blades are arranged sloped to the direction of movement of the meat so as to cut all fibers, Ross U.S. Pat. No. 3,535,734 is also concerned with this problem except in this patent the knives are in two sets at right angles to each other and means are provided for shifting the conveyor and thereby the meat laterally of the set of knives. The apparatus of the present invention provides a simpler, less expensive and more satisfactory way in which the knives themselves are arranged so that the blades in the assembly cover all portions of the meat regardless of how the meat is oriented relative to the knives and thus to the direction of movement of the conveyor.

BRIEF DESCRIPTION OF THE DRAWINGS

FIG. 6 is a shortened side elevational view of one knife set including a piston and a pair of blades.

FIGS. 7 and 8 are side elevational views taken at 90° to each other and illustrating the shape of the penetrating edge and point of each of the blades.

FIG. 9 is a transverse sectional view taken substantially along line 9—9 of FIG. 6.

FIG. 10 is an enlarged schematic elevational view showing the relationship of the knives and friction blocks in the first two knives of the four transverse rows of knives in each head 30 and the relationship of the knives to each other.

FIG. 11 is a schematic view of the pattern of incisions made in a section of meat tenderized with the apparatus of this invention with the upper portion of the view illustrating the meat when penetrated by all blades and the lower portion illustrating the incisions after penetration by the fourth and third rows of knives as the meat is moved in the direction 53 and before the meat has reached the second and first rows.

DESCRIPTION OF THE PREFERRED EMBODIMENT

The illustrated embodiment discloses the invention as applied to a bone-in tenderizer where each knife with its corresponding blade structure is yieldable when the knife strikes the bone in the manner described in the above prior U.S. Pat. No 3,842,464.

Figure 1:
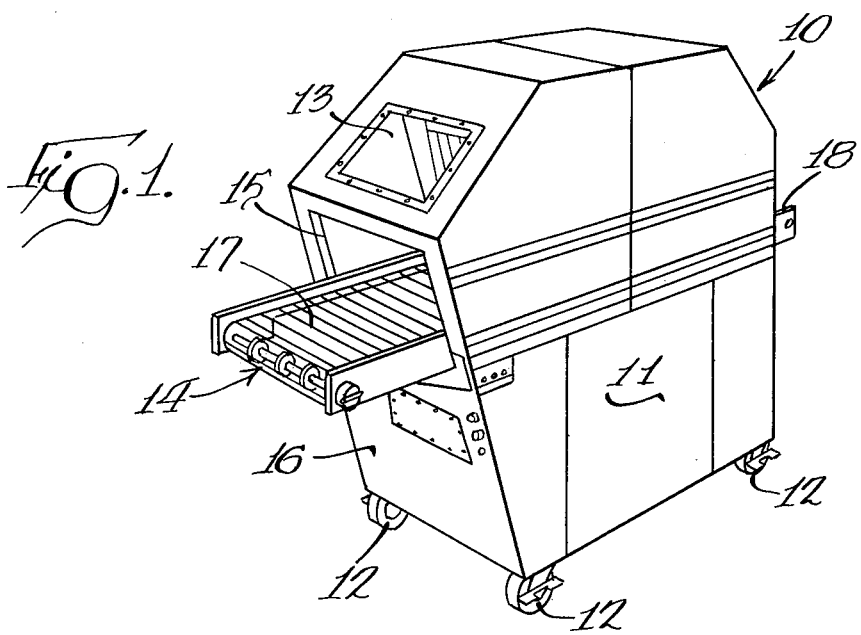
FIG. 1 is a perspective view of a meat tenderizing apparatus embodying the invention.

In the illustrated embodiment the meat tenderizer 10 comprises a cabinet 11 that is movably mounted on casters 12 in the customary manner with the cabinet 11 including a viewing window 13 at one end and the customary meat conveyor 14 extending from the cabinet 11 through an opening 15 at this one end 16 of the cabinet and beneath the window 13. This conveyor 14 as shown in FIG. 1 has its forward end 17 completely exposed so that the cuts of meat to be tenderized may be placed thereon for travel through the tenderizing station and removed from the opposite end 18 of the conveyor.

Figure 2:
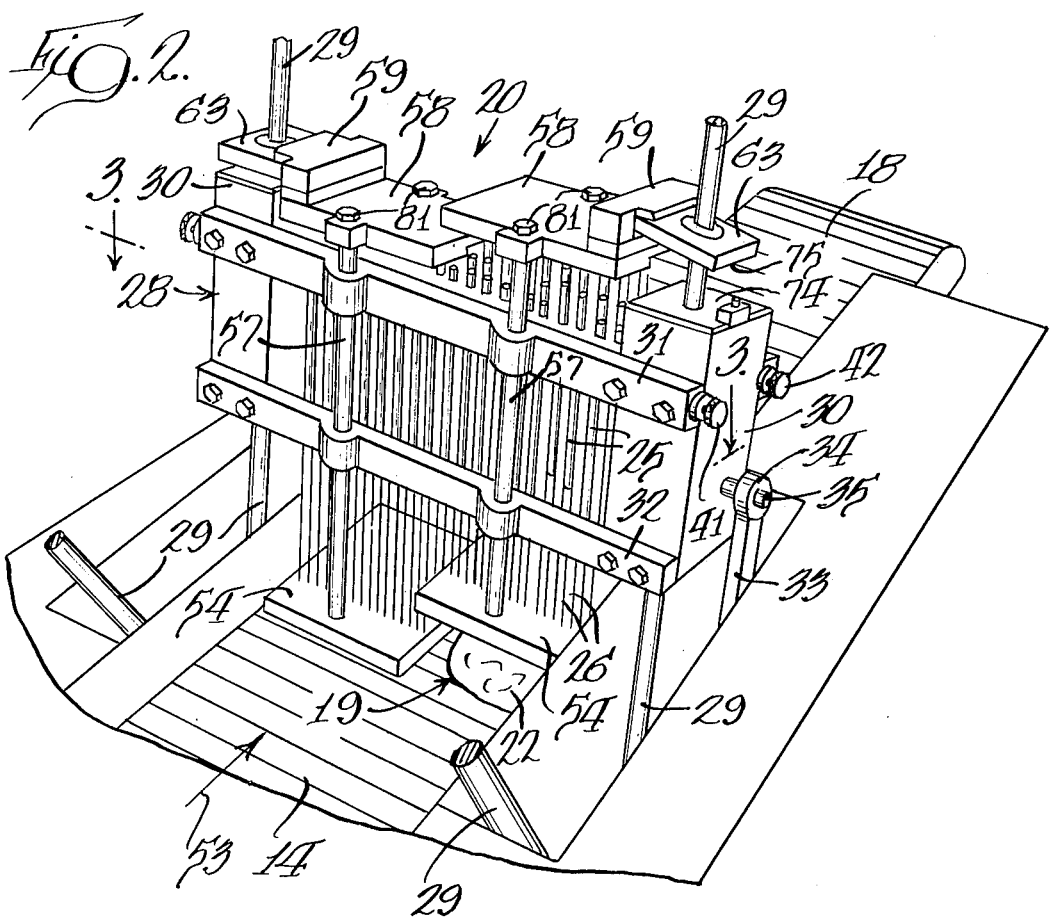
FIG. 2 is a fragmentary, perspective view of one embodiment of the invention using two sets of knives in an angular relationship generally as disclosed in the above U.S. Pat. No. 3,736,623 but with only one set shown for clarity of illustration and the position of the other set indicated by the arrangement of two parallel guide rods 29 at the bottom of the Figure on which the other head similar to the head 28 is mounted for reciprocation.

As is illustrated in FIG. 2 the interior of the cabinet 11 provides a tenderizing station 19 containing a pair of meat tenderizing devices 20 angled downwardly toward each other and the conveyor 14. Only one device 20 is disclosed in FIG. 2 with the second being illustrated by the other pair of angled parallel guide rods 29. In general, the angled relationship is converging toward the conveyor 14 as illustrated in the above U.S. Pat. No. 3,726,623.

Figure 4:
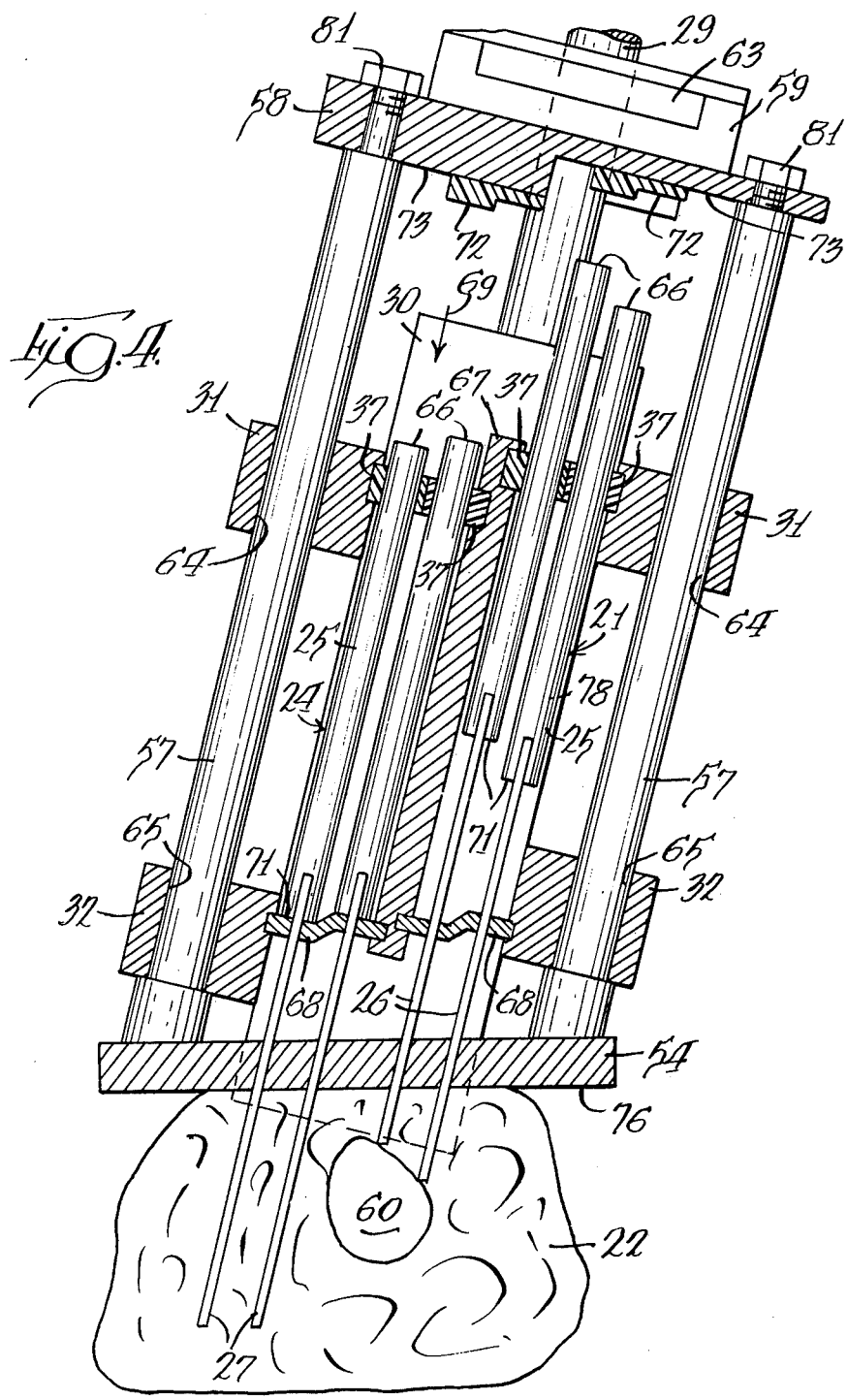
FIG. 4 is a vertical sectional view taken through the apparatus of FIG. 2 with the knives in meat penetrating position.

The apparatus of the embodiment disclosed and described herein is for tenderizing meat 22 that may contain bones as illustrated at 60 in FIG. 4. Each knife therefore is force yieldable and the knives are in sets each comprising a piston 25 on the lower end of which are attached a plurality, here shown as a pair, of knife blades 26. Each pair of knife blades is spaced apart and parallel to the longitudinal axis of its piston 25 as shown in FIG. 6.

Each blade 26 is elongated and has opposite ends one 52 of which comprises a sloped cutting edge 27 and the other 61 of which is attached to one side of the lower end of the piston 25. Thus each knife 24 comprises an elongated piston 25 and a plurality (here shown as a pair) of elongated knife blades 26 on opposite sides thereof with each piston and its knives substantially parallel. Such a knife structure with force yieldable means is described and claimed in the above U.S. Pat. No. 3,842,464.

Figure 5:
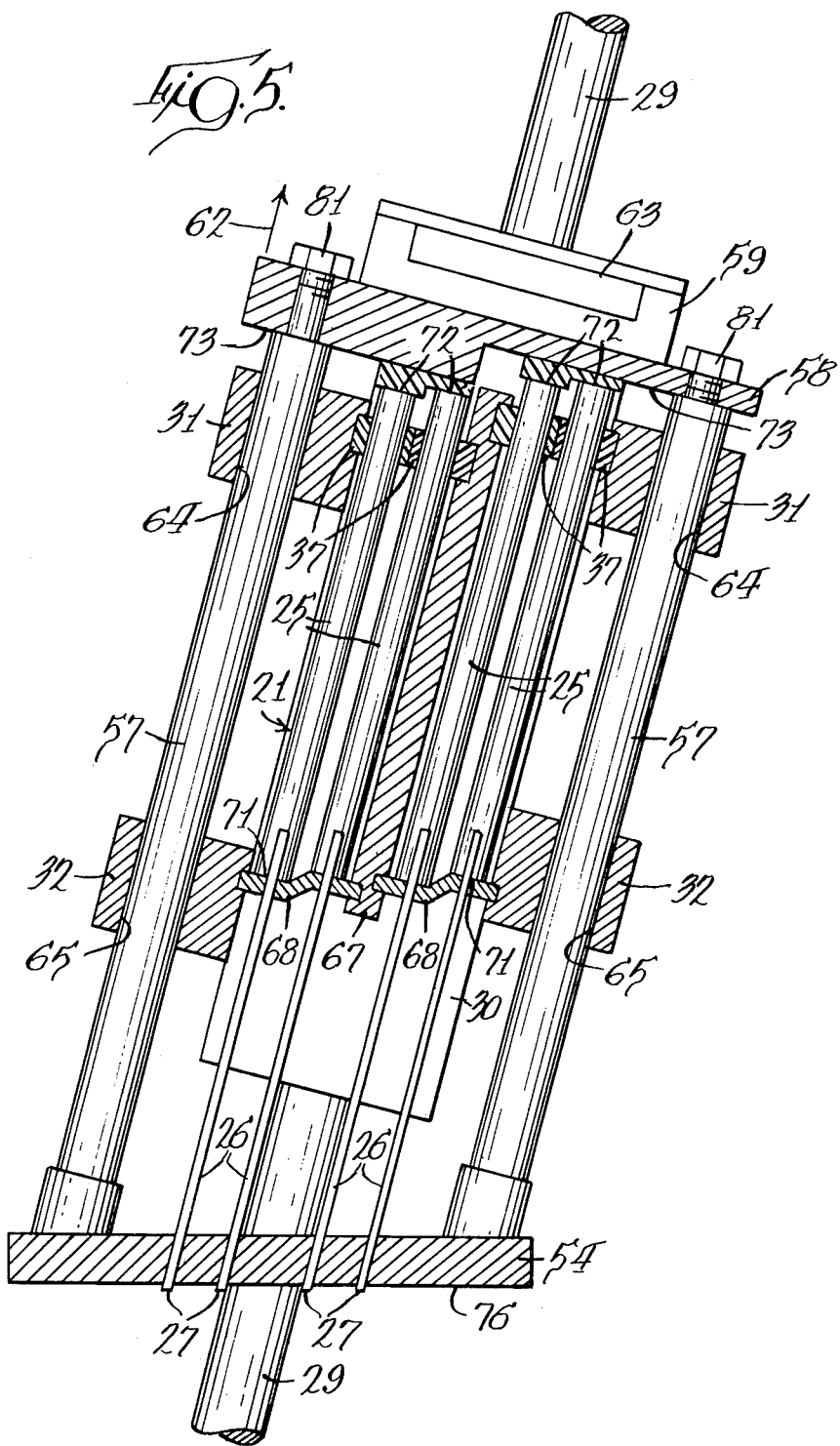
FIG. 5 is a view similar to FIG. 4 but illustrating the structure during withdrawal of the knives from the meat.

The tenderizing apparatus 20 comprises means for reciprocating the knives to project and withdraw the cutting edge ends 52 into and from the meat on a retainer embodied in the conveyor 14. FIG. 5 illustrates the position of the blades 26 and associated structure preparatory to projecting the blades into the meat 22 while FIG. 4 illustrates the projecting of the blades into the meat that contains a bone 60.

In the illustrated embodiment the means for reciprocating the knives in this manner into and out of the meat to cut the fibers and tissues therein comprises spaced knife operating heads 28 angled toward each other of which only one is shown. Each head is slidably mounted for reciprocation on parallel sloped guide rods 29 on opposite sides of the conveyor 14. Each head 28 comprises slide blocks 30 that are the elements slidable generally vertically but at an angle to the conveyor 19 and thus to the meat 22. Blocks 30 are slidable on the rods 29 and the blocks 30 are connected by opposite pairs of upper 31 and lower 32 (FIG. 2, 4 and 5) parallel metal bars bolted to the slide blocks 30 in order to provide for secure reciprocation.

The device 20 comprising the slide blocks 30 and the two pairs of rigid interconnecting bars 31 and 32 are reciprocated generally vertically but at an angle on the guide rods 29 by oppositely located drive rods 33 each having a head 34 hingedly connected to a pin 35 projecting outwardly from each of the slide blocks 30.

Figure 3:
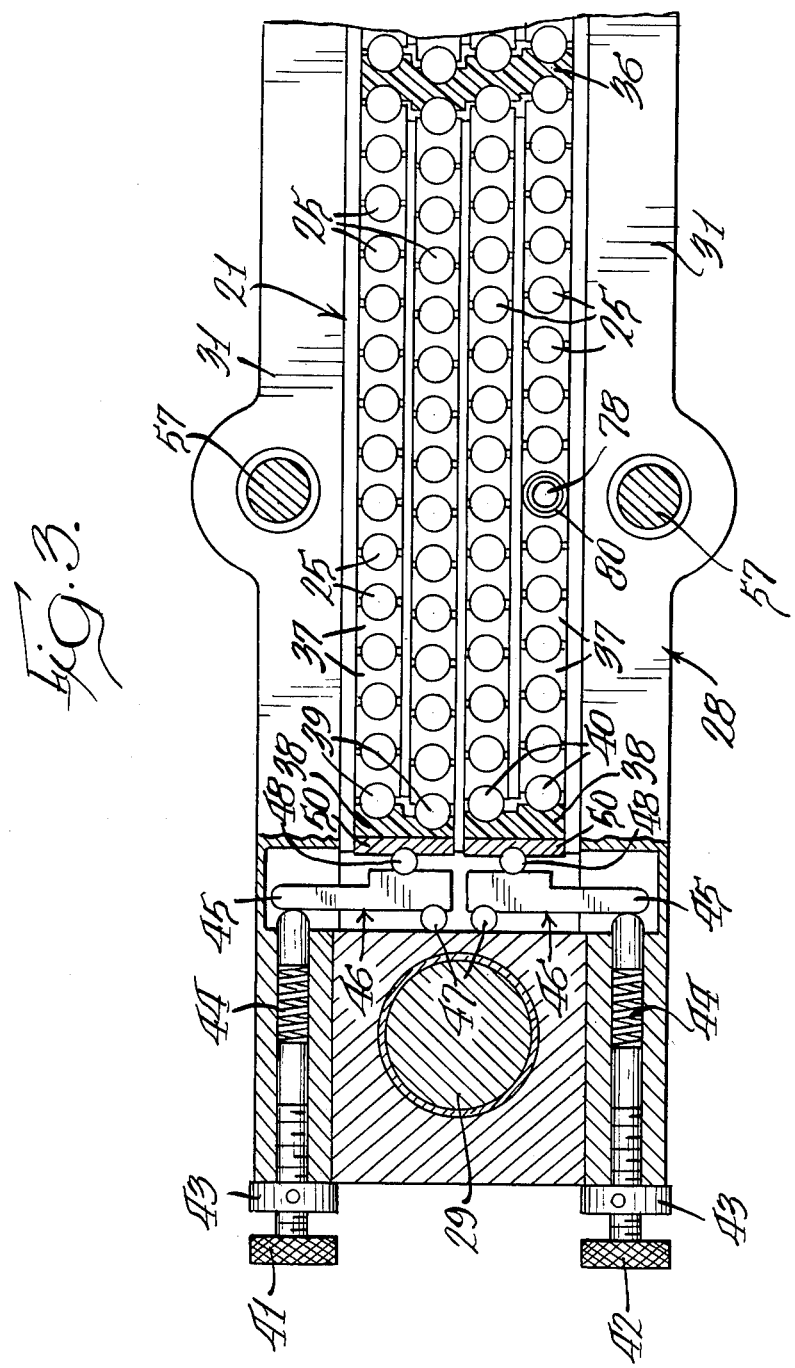
FIG. 3 is a fragmentary horizontal sectional view taken substantially along line 3—3 of FIG. 2.

In order to apply a yieldable force when a blade of an individual knife strikes a bone or other preselected resistance a friction structure is provided as illustrated in FIGS. 3-5 and 10. This yieldable structure comprises a stationary center friction block 36 at about the center of the device 20 and a series of spaced friction blocks 37 arranged on opposite sides and closely embracing the linear series of pistons 25 of which four such transverse linear series are illustrated in FIGS. 3, 10 and 11 and identified in FIGS. 10 and 11 as 1st, 2nd, 3rd and 4th rows.

As shown in FIG. 3 the friction pressure of the laterally movable blocks 37 on the sides of the pistons 25 is adjustable by providing pressure blocks 38 each engaging two end pairs of pistons 39 and 40 in the four rows of knives (FIG. 10). This pressure is varied by adjusting screws 41 and 42 each having a lock collar 43 and each bearing against a spring 44. Each of the screws 41 and 42 and spring 44 combinations applies pressure to one end 45 of a second class lever 46 that is fulcrumed on a roller 47 at the opposite end of the lever 46 to apply pressure to a second roller 48 which in turn bears against a pressure plate 50 to apply pressure to the corresponding pressure block 38. This applies compressive force to the corresponding friction blocks 37 and thereby provides an adjustable friction force to the knife pistons 25. A similar arrangement (not shown) is provided on the opposite end of the structure of FIG. 3.

In order to hold the meat 12 down when the knives are withdrawn as indicated by the direction arrow 62 (FIG. 4), there are provided meat retaining means comprising a plurality of retainers 54 (here shown as two) that span the width of the conveyor 14 at the meat tenderizing station 19. Each retainer 54 is mounted on the bottoms of a pair of parallel rods 57 on each of the opposite sides of each knife operated head 28 with these rods being guided for generally vertical movement by engaging openings 64 and 65 in the horizontal guide strips 31 and 32, respectively. These rods are arranged in two pairs in the illustrated embodiment with each pair having mounted on their lower ends a meat retaining plate 54.

The upper ends of the pairs of rods 57 above the upper pair of guide strips 31 carry similar plates 58. These plates 58 serve as reset plates that are engaged by the upper ends 66 of the pistons 25 of the sets of knives in order to realign the cutting edges 27 of the knives at the completion of the retraction stroke 62 as is illustrated in FIG. 5.

The lower pair of guide strips 32 which are arranged on opposite sides of the bottom of the vertical divider plate 67 carry elongated flat blade 26 guides 68. As is shown in FIGS. 4 and 5 the bottom ends 71 of the pistons 17 of the sets of knives normally bear against the upper surfaces of the blade guide strips 68 with the knives 26 themselves extending therethrough. However, when one or more knives strike an obstruction such as a bone 60 (FIG. 4) the downward movement of these knives stops so that the friction blocks 37 slide downwardly relative to the stopped pistons thereby to prevent damage to the knives that engage the obstruction.

When the knive operating heads 28 are moved upwardly the upper ends 66 of the knives engage resilient bumper strips 72 on the bottom stepped surfaces 73 of the upper reset plates 58. This causes the cutting edges 27 of all of the knives to be substantially horizontally aligned beneath the meat retaining plates 54 (FIG. 5) ready for the next meat penetrating stroke.

In order to hold the retainer plates 54 against the meat 22 while the blades 26 are being withdrawn 40 so that the meat will not be carried with the ascending knives there are provided means for locking the retainers 54 in the meat engaging position during this withdrawal of the knives from the meat. This means for locking comprises a tiltable locking device 63 in the form of a plate extending laterally from a bracket 59 mounted on the outside end of each reset plate 58. Each locking plate 63 has extending through it a guide rod 29 as shown in FIGS. 1 and 2.

With this structure when each knife operating head 28 has been lowered to meat penetrating position with the meat retaining plates 54 in lowered meat contacting position the withdrawing of the top 74 of each block 30 from beneath the bottom 75 of each locking plate 63 permits the plate to tilt by gravity (FIG. 2) and lock the meat retaining plates 54 against the meat. Then when the blades 26 are withdrawn from the meat by raising the slide blocks 30 the tops 74 of the blocks 30 again move upwardly into engagement with the bottoms 75 of the lock plates 63 with the intention being to level the plates 63 to the position shown at the left of FIG. 1 wherein the whole structure including the meat retaining plates can move upwardly with the rising slide blocks 30 of the knife operating head 28.

Each locking plate 63 has an inner end resting within a recess in a hinge bracket 59. With this structure the locking plates 63 are held without using hinge pins or other connectors for arcuate rocking movement between the extreme jamming-locking position of the right side of FIG. 2 and the horizontal release position of the left side of FIG. 2 merely by the rocking movement of the plates 63 about their brackets 59.

In the apparatus of this invention the angled and spaced relationship of the blades causes the assembly of blades to penetrate every portion of the meat in relatively narrow spacing so that all fibers and toughening elements are severed into short pieces thereby greatly improving the tenderness of the meat. Thus as can be seen particularly in FIG. 10, the blades 26 each have a sharp meat penetrating and severing end 52 that is transversely planar as can be seen in FIG. 8 and arranged at an angle greater than 0° to, that is not aligned with, the direction of movement 53 of the conveyor 14.

In the illustrated embodiment, as shown in the upper left corner of FIG. 10 this angle is about 50° and in any event is acute.

In the illustrated embodiment the blades 26 are arranged in a plurality of parallel first rows parallel to the direction 53 of travel of the conveyor 14 as illustrated by the broken lines A, B, C and D in FIGS. 10 and 11. The knives 25 themselves and thus the blades comprising the knives are also arranged in a plurality of transverse second rows extending transversely to this path 53 of movement and identified in FIGS. 10 and 11 as 1st, 2nd, 3rd and 4th rows.

The blades 26 in the first transverse row 55 corresponding to the lines A-D are arranged in two pairs with one pair as shown in the first 55 and second 56 rows of corresponding blades being parallel to each other. The blades in the third and fourth rows are also parallel to each other. The blades in other pairs of transverse rows and specifically the first and third and second and fourth are arranged at an angle to each other so as to produce a pattern of cuts in the meat 19 as illustrated in the upper portion of FIG. 11. In the illustrated embodiment the blades are arranged in pairs with each pair being parallel to each other and mounted on opposite sides of a piston 25. Thus each series of pistons 25, which as shown in FIG. 10 are the vertical series or parallel to the conveyor travel 53, provides four rows, rows A and C and C and D, of blades 26 having the spacing and angular relationship as described.

As can be seen, therefore, each row A, B, C or D, (parallel to direction 53) as repeated in units of four from the left side of FIG. 10 to the opposite side of the apparatus, is occupied by a single blade and the blades in each row are laterally spaced or to the right and left as shown in FIGS. 10 and 11 so that each blade is in the longitudinal shadow of another blade (with respect to the direction of movement 53) with the result that the assembly of blades in all rows spans substantially the entire meat carrying portion of the conveyor. In other words, as is illustrated by the series of parallel broken lines A-D in FIGS. 10 and 11 each blade has an edge that is in projected overlap with another blade. Thus the blade 26 in the row A 55 overlaps the corresponding blade 26 in row D and the corresponding blades in rows B and C similarly overlap or are in the longitudinal projected shadow of each other.

To summarize the above, therefore, the blades 26 in the illustrated embodiment are arranged in four transverse rows that are transverse to the direction 53 of movement of the conveyor 14 and thus of the meat 22 carried by the conveyor. Then the individual blades 26 themselves which are mounted in pairs on the frictionally retained pistons 25 are arranged in longitudinal rows A, B, C and D as shown in FIGS. 10 and 11 with these longitudinal rows being parallel to the direction of travel 53. This arrangement of corresponding blades in the four transverse rows particularly when combined with the angled travel of the blades into the meat causes very close and overlapping patterns of cuts as illustrated in FIG. 11 so that, regardless of the orientation of the pieces of meat 22 on the conveyor, none of the fibers can escape the knives and the fibers are cut in relatively short lengths.

This same arrangement is true for the entire width of the blades assembly so that as the blades are reciprocated into and out of the meat and as the meat is moved along in increments and held stationary during the penetration of the meat every portion of the meat is penetrated and every toughening element is severed into small portions whether these toughening elements are gristle, tendons, or the like.

The operation of the tenderizing apparatus as illustrated in the illustrated embodiment is as follows:

The knife operating heads 28 (of which only one is illustrated in the drawings) are reciprocated on their parallel guide rods 29 by the customary drive including the drive connecting rods 33 at the opposite ends of the heads 28. Reciprocation in a downward direction applies a yieldable force to the sets of knives by the engagement of the pistons 25 of the knife sets with the friction blocks 37 whose friction force is easily regulated by the screws 41 as described above. This friction force is sufficient to drive the blades 26 into the meat as illustrated in FIG. 4. However, when any of the blades 26 strikes an obstruction such as the bone 60 of FIG. 4 this particular blade or blades 26 stop so that the corresponding piston is held stationary while the friction blocks 37 slide downwardly on the outer surfaces of the pistons.

The downward movement of the knife operating heads 28 presses the meat retaining plates 54 against the meat and because of the plurality of transversely adjacent plates 54 the hold-down structure is adjustable to meats of varying thicknesses and even to operating with side-by-side rows of meat such as a double row of meat of the size of the single example 22 in FIG. 1. When the operating head 28 has reached the lowermost position as shown in FIG. 1 the locking plates 58 will have gravity tilted to lock the plate 63 to the respective drive rod 29. Then when the knife operating head starts its upward motion by operation of the drive rods 33 each plate 54 will be retained with its bottom surface 76 against the meat while the blades 26 are withdrawn therefrom as previously described.

The friction blocks 37 which provide the yieldable knife retaining force on the pistons 25 may be of any material desired, preferably a plastic which may be nylon, Delrin, Rulon and the like. Delrin is a solid acetal homopolymer while Rulon is a reinforced Teflon with copper being a customary reinforcing agent.

As can be seen in FIGS. 6 and 9, the blades 26 have their upper ends 61 attached to the lower end 77 of each piston 25. Each knife end 61 is located within peripheral recesses 49 so as to be completely within the periphery or circumference of a piston. This provides a very convenient structure for quickly replacing a knife set 24 as when a blade 26 is broken or otherwise damaged. In those instances it is only necessary to remove the corresponding reset plate 58 by removing the corresponding pair of nuts 81 and then the particular reset plate 58 and the attached bumper strips 72. It is then only necessary to lift the knife set 24 including the blades 26 and pistons 25 upwardly to remove it from the apparatus and then reinsert another knife set 24 and reattach the particular reset plate.

Having described my invention as related to the embodiment shown in the accompanying drawings, it is my intention that the invention be not limited by any of the details of description, unless otherwise specified, but rather be construed broadly within its spirit and scope as set out in the appended claims.

I claim:

1. Apparatus for tenderizing meat, comprising: a conveyor for conveying meat in a longitudinal direction through said apparatus; a mounting member above and transverse to said conveyor; a plurality of knives comprising elongated blades on said mounting member having sharp meat penetrating and severing blade ends adjacent to said conveyor, each said blade end being transversely planar and arranged at an angle other than 0° to said direction of movement of said conveyor; means for arranging said blades in a plurality of spaced first rows extending longitudinally of said direction of movement and a plurality of spaced second rows extending transversely to said direction of movement, the collective said blades in said plurality of second rows include some blade ends in some combinations of said second rows parallel to each other and other blade ends in other combinations of said second rows at an acute angle to each other; and means for reciprocating said mounting member toward and away from said meat and thereby said knives into and from meat penetration.

2. The apparatus of claim 1 wherein said angle of said blade end is acute.

3. The apparatus of claim 1 wherein said first rows are spaced substantially equal distances apart.

4. The apparatus of claim 1 wherein each said blade end is at an acute angle to its said row, pairs of said blade ends being parallel to each other and other pairs being at an acute angle to each other.

5. The apparatus of claim 1 wherein each said row is occupied by a single blade.

6. The apparatus of claim 5 wherein said rows span substantially the entire lateral width of the meat conveying portion of said conveyor in substantially equal increments.

7. The apparatus of claim 1 wherein said blades are arranged in a plurality of spaced rows each extending longitudinally of said direction of movement and said rows are parallel to each other and to said direction of movement, each said blade end being at an acute angle to its said row, pairs of said blade ends being parallel to each other and other pairs being at an acute angle to each other.

8. The apparatus of claim 7 wherein each said row is occupied by a single blade and said rows span substantially the entire lateral width of the meat conveying portion of said conveyor in substantially equal increments.

9. The apparatus of claim 1 wherein each said knife comprises a piston on which is mounted a plurality of said blades parallel to each other and to their said piston.

10. The apparatus of claim 9 wherein there are a pair of said blades located on opposite sides of said piston.

11. The apparatus of claim 1 wherein said blades are arranged in a plurality of spaced rows each extending longitudinally of said direction of movement and means are provided for mounting the blades in said rows in laterally spaced but longitudinally overlapping shadow relationship so that each blade is in the longitudinal shadow of another blade with the result that the assembly of said blades spans substantially the entire meat carrying portion of said conveyor.

12. The apparatus of claim 11 wherein each said blade end is at an acute angle to its said row, pairs of said blade ends being parallel to each other and other pairs being at an acute angle to each other.

13. The apparatus of claim 1 wherein each said knife is force yieldable and comprises a reciprocable piston on which each said elongated blade is mounted, force yieldable means independently retaining each said knife in meat penetrating position on said mounting member, said force yieldable means comprising friction members engaging said pistons which are slidable relative thereto when a said blade strikes an obstruction, and means for returning said knives to said meat penetration position upon said reciprocating from said meat.

14. The apparatus of claim 13 wherein the cross sectional area of each piston is considerably greater than the cross sectional area of its said blade.

15. The apparatus of claim 13 wherein said friction members are arranged in pairs with each pair being on opposite sides of a said piston and means are provided for adjusting the pressure force of each said pair against its piston in order to predetermine the yieldable force required to cause yielding of each said piston.

16. The apparatus of claim 13 wherein there are provided a reciprocable frame on which said knives are mounted with each piston being above a guide through which said blades extend and a bumper member located substantially at the upper limit of said reciprocation engaged by said pistons for returning any force yielded knife to its said meat penetrating position on reciprocation movement of said knives to said position.

17. The apparatus of claim 13 wherein there are provided a plurality of said blades on each said piston with the blades on each piston being substantially parallel to each other and to their said piston.

18. The apparatus of claim 17 wherein each said blade has a meat penetrating and meat severing sloped end and the said penetrating and severing ends of the blades on each piston are adjacent to but spaced from each other.

19. The apparatus of claim 17 wherein said blades each have an end attached to a said piston in a recess within the circumference of the piston at the area of said attachment.

* * * * *